United States Patent Office 3,413,311
Patented Nov. 26, 1968

3,413,311
4-OXA PREGNANE DERIVATIVES
Alexander D. Cross, Mexico City, Mexico, assignor to Syntex Corporation, Panama, Panama, a corporation of Panama
No Drawing. Filed Mar. 5, 1965, Ser. No. 437,583
23 Claims. (Cl. 260—340.5)

ABSTRACT OF THE DISCLOSURE

Novel 3-keto-4-oxa derivatives of the pregnane series having anti-inflammatory, glycogenic and thymolytic activities.

---

This invention relates to novel cyclopentanopolyhydrophenanthrene derivatives, and to processes for the preparation thereof.

More particularly, this invention relates to novel 3-keto-4-oxa-5α- and 5β-pregnane and Δ¹-pregnene derivatives which are represented by the following formula:

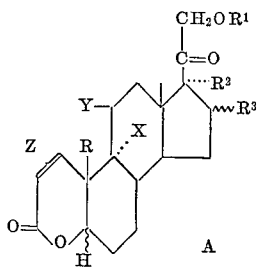

A

In this formula R represents hydrogen or methyl, $R^1$ represents hydrogen or a hydrocarbon carboxylic acyl group, $R^2$ represents hydroxyl, $R^3$ represents hydrogen, α-methyl, β-methyl, α-hydroxyl or an α-hydrocarbon carboxylic acyloxy group, $R^2$ and $R^3$ taken together represent the grouping

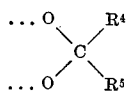

wherein $R^4$ and $R^5$ represent hydrogen, an alkyl (including cycloalkyl) group or an aryl (including aralkyl and alkaryl) group containing up to 8 carbon atoms, inclusive, such as methyl, ethyl, propyl, phenyl, tolyl, xylyl, benzyl, and the like, X represents hydrogen or a halogen having an atomic number less than 53, i.e., fluoro, chloro or bromo, Y represents hydrogen, β-hydroxyl or a keto group, with X being hydrogen when Y is hydrogen, and Z represents either a saturated linkage or a double bond between C-1 and C-2.

The acyloxy and acyl groups referred to herein are preferably derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel 3-keto-4-oxa-5α- and 5β-pregnene and Δ¹-pregnene derivatives represented by formula A hereinabove are cortical hormones having anti-inflammatory, glycogenic and thymolytic activities.

These novel compounds can be prepared by processes which can be illustrated schematically as follows:

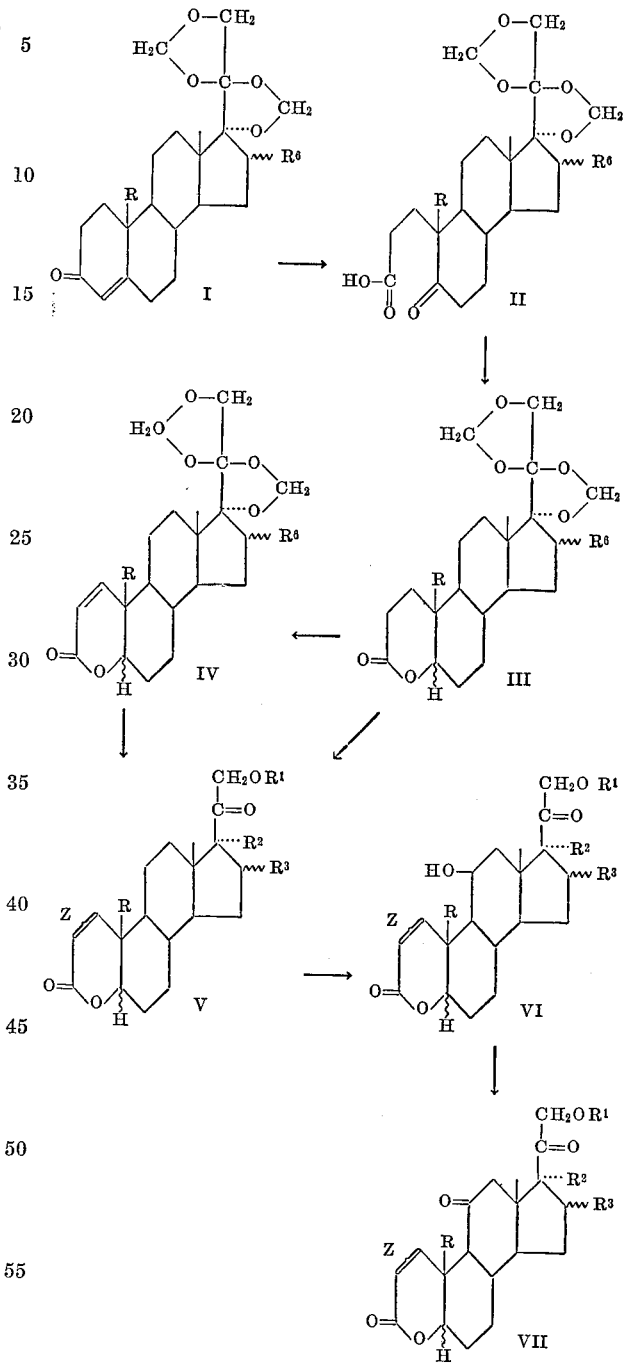

In these formulas R, $R^1$, $R^2$, $R^3$ and Z have the same meanings as set forth hereinabove for formula A, and $R^6$ represents hydrogen, α-methyl, β-methyl or α-hydroxyl.

In carrying out these processes, the starting material I is a 17,20;20,21-bismethylenedioxy derivative of Δ⁴-pregnene-17α,21-diol-3,20-dione, 19-nor-Δ⁴-pregnene-17α,21-diol-3,20-dione, 16α-methyl-Δ⁴-pregnene-17α,21-diol-3,20-dione, 16α-methyl-19-nor-Δ⁴-pregnene-17α,21-diol-3,20-dione, 16β-methyl-Δ⁴-pregnene-17α,21-diol-3,20-dione, 16β-methyl-19-nor-Δ⁴-pregnene-17α,21-diol-3,20-dione, Δ⁴-pregnene-16α,17α,21-triol-3,20-dione, or 19-nor-Δ⁴-pregnene-16α,17α,21-triol-3,20-dione, obtainable by the conventional reaction of the corresponding free dihydroxyacetone side chain-containing steroid with formaldehyde in the presence of a strong acid catalyst.

The starting material I, dissolved in an organic solvent such as methylene dichloride, ethyl acetate (which can contain trace or larger amounts of acetic acid), or the like, is reacted with a stream of ozone at a temperature of from about —100° C. to about —20° C., and preferably at about —70° C. until excess ozone is present in the reaction mixture, and then with from about 0.5% to about 5% by volume, and preferably with about 1% by volume, based on the volume of the ozonized solution, of an aqueous solution of hydrogen peroxide (or with an equivalent amount of hydrogen peroxide solution of a different concentration), at a temperature of from about —20° C. to about 30° C., and preferably at room temperature (about 25° C.), for from about 10 to about 40 hours, thus giving the corresponding 3,5-seco-5-one-3-oic acid II, 17,20; 20,21-bismethylenedioxy-3,5-secopregnan-5-one-3-oic acid (II; R=methyl; $R^6$=hydrogen).

The thus-obtained 3,5-seco-5-one-3-oic acid is then dissolved in aqueous dioxane or an aqueous lower alkanol, e.g., methanol or ethanol, and reduced with sodium borohydride at about 0° C. for from about 12 to about 24 hours, thus giving, after acidification of the clear solution with a strong acid, e.g., hydrochloric acid or the like, preferably, in an amount sufficient to give a pH of from about 1 to 4, a mixture of the corresponding 4-oxa-5α-3-one and 4-oxa-5β-3-one III, e.g., 17,20;20,21-bismethylenedioxy-4-oxa-5α-pregnen-3-one and 17,20;20,21-bismethylenedioxy-4-oxa-5β-pregnan-3-one (III; R=methyl; $R^6$=hydrogen), which can be separated into the individual 5α- and 5β-isomers by fractional crystallization or chromatography. Alternatively, the mixture of 5α- and 5β-isomers can be used as such in the remaining reactions, and the separated 5β-isomer can also be used as an intermediate in the remaining reactions, thus giving the corresponding 5β-isomers of compounds.

The 4-oxa-5α(or 5β)-3-one can be dehydrogenated at the C–1(2)-position by dissolving it in an inert organic solvent, e.g., an ether such as dioxane, an aromatic hydrocarbon such as benzene, toluene or xylene, or the like, and reacting with at least one molar equivalent, and preferably with from about 2 to about 5 molar equivalents, per mol of steroid, of 2,3-dicyano-5,6-dichlorobenzoquinone, at reflux temperature for from about 70 to about 150 hours, thus giving, for example, 17,20;20,21-bismethylenedioxy-4-oxa-Δ¹-5α(or 5β)-pregnen-3-one (IV; R=methyl; $R^6$=hydrogen).

Both the 4-oxa-5α(or 5β)-pregnan-3- one (III) and the 4-oxa-Δ¹-5α(or 5β)-pregnen-3-one (IV) can be hydrolyzed in known manner, e.g., using aqueous 60–90% formic acid at reflux temperature for 1–10 minutes, to give the corresponding free dihydroxyacetone side chain-containing steroid V, e.g., 4-oxa-5α(or 5β)-pregnane-17α,21-diol-3, 20-dione (V; R=methyl; $R^1$ and $R^3$=hydrogen; $R^2$=hydroxyl; Z=a saturated linkage) or 4-oxa-Δ¹-5α(or 5β)-pregnene-17α, 21-diol-3,20-dione (V; R=methyl; $R^1$ and $R^3$=hydrogen; $R^2$=hydroxyl; Z=double bond).

Esterification of the 21-(and 16α) hydroxyl group in the thus-obtained free dihydroxyacetone side chain-containing steroid is effected by using an acid anhydride or chloride, e.g., of an acid such as those mentioned hereinabove, in pyridine at room temperature for 8 hours or longer. Thus, for example, esterification of 4-oxa-5α-pregnene-17α,21-diol-3,20-dione with acetic anhydride in pyridine at room temperature for 8 hours gives 4-oxa-5α(or 5β) - pregnane - 17α,21 - diol - -3,20 - dione 21 - acetate (V; R=methyl; $R^1$=acetyl; $R^2$=hydroxyl; Z=a saturated linkage).

Similarly, a 16α,17α-dihydroxy steroid V can be converted to the corresponding 16α,17α-acetal and ketal derivatives in the manner described in U.S. Patent No. 3,048,581 to Fried, i.e., by reacting it with the aldehyde or ketone at room temperature in the presence of a strong acid catalyst, such as perchloric acid, p-toluenesulfonic acid, or the like. Thus, for example, by reacting 4-oxa(or 5β)-pregnane-16α,17α,21-triol-3,20-dione with acetone at room temperature in the presence of a catalytic amount of perchloric acid for 1 hour, 4-oxa-16α,17α-isopropylidenedioxy-5α(or 5β)-pregnan-21-ol-3, 20-dione (V; R=methyl; $R^1$=hydrogen; $R^2$ and $R^3$=isopropylidenedioxy; Z=a saturated linkage) is obtained.

The free 21-hydroxy group in a 16α,17α-cyclic acetal or ketal derivative V can then be esterified, if desired, in the manner described hereinabove.

Adrenal incubation of a 4-oxa steroid V in the manner described in U.S. Patent No. 2,671,752 to Zaffaroni produces the corresponding 11β-hydroxy steroid VI, e.g., 4-oxa-5α(or 5β)-pregnane-11β,17α,21-triol-3,20-dione (VI; R=methyl; $R^1$ and $R^3$=hydrogen; $R^2$=hydroxyl; Z=a saturated linkage).

Oxidation of the 11β-hydroxy group in the thus-obtained triol (after first protecting free 21- or 16-hydroxyl groups, if present, by esterification or, in the case of a 16-hydroxyl group, by 16α,17α-cyclic acetal or ketal formation in the manner described hereinabove), using chromium trioxide in pyridine at room temperature or 8 N chromic acid in acetone solution at about 0° C., gives the corresponding 11-keto steroid VII; e.g., 4-oxa-5α(or 5β)-pregnane-17α,21-diol-3,11,20-trione 21-acetate (VII; R=methyl; $R^1$=acetyl; $R^2$=hydroxyl; $R^3$=hydrogen; Z=a saturated linkage).

Ester groups at the 21- and 16-positions in this 11-keto steroid can be hydrolyzed, using a 1–5%, and preferably a 2%, methanolic solution of sodium potassium bicarbonate at a temperature of from about 0° C. to about 30° C., and preferably at about 10° C., under an inert nitrogen atmosphere, thus given, for example, 4-oxa-5α(or 5β) - pregnane - 17α,21 - diol - 3,11,20 - trione (VII; R=methyl; $R^1$ and $R^3$=hydrogen; $R^2$=hydroxyl; Z=a saturated linkage).

A halogen atom is then introduced at C–9 by the method described by Fried et al., J. Am. Chem. Soc., 79, 1230 (1957). By heating the 11β-hydroxy derivative (VI) wherein the 21-hydroxyl group and, if present, a 16-hydroxyl group have been protected in the manner described hereinabove, with methanesulfonyl chloride in mixture with pyridine and dimethylformamide, there is obtained the corresponding 9(11)-dehydroxy steroid, e.g., 4-oxa-Δ⁹⁽¹¹⁾-5α(or 5β)-pregnene-17α,21-diol-3,20-dione 21-acetate, which upon treatment with a reagent capable of generating hypobromous acid, such as N-bromoimide or the hypobromite of an alkali or alkaline earth metal, preferably N-bromoacetamide, in the presence of aqueous perchloric acid in dioxane, afforded the corresponding bromohydrin, 4-oxa-9α-bromo 5α(or 5β)-pregnane-11β,17α,21-triol-3,20-dione 21-acetate.

Oxidation of the 11β-hydroxyl group in this bromohydrin can be carried out in the manner described hereinabove to give the corresponding 11-keto steroid, e.g., 4-oxa-9α-bromo-5α(or 5β)-pregnane-17α,21-diol-3,11,20-trione 21-acetate.

Similarly, ester groups at the 21- and 16-positions in either the bromohydrin or the 9α-bromo-11-keto steroids can be hydrolyzed in the manner described hereinabove for the 11-keto steroid (VII) to give the corresponding free hydroxy steroids, e.g., 4-oxa-9α-bromo-5α(or 5β)-pregnane-11β,17α,21-triol-3,20-dione or 4-oxa-9α-bromo-5α(or 5β)-pregnane-17α,21-diol-3,11,20-trione.

Upon refluxing the bromohydrin, wherein the 21-hydroxyl and, if present, a 16-hydroxyl group, have been esterified in the manner described hereinabove, under substantially anhydrous conditions with potassium acetate in acetone or dioxane-methanol, there is obtained the corresponding 9β,11β-oxido steroid, e.g., 4-oxa-9β, 11β-oxido-5α(or 5β)-pregnane-17α,21-diol-3,20-dione 21-acetate.

By reaction of the 9β,11β-oxido compound with hydrogen fluoride of hydrogen chloride in an inert solvent, such as methylene dichloride, chloroform, or the like, under anhydrous conditions and low temperature, there was formed the corresponding 9α(fluoro or chloro)-11β-hydroxy, e.g., 4-oxa-9α-(fluoro or chloro)-5α(or 5β)-pregnane-11β,17α,21-triol-3,20-dione 21-acetate.

Oxidation of the 11β-hydroxyl group in this 9α-(fluoro or chloro)-11β-hydroxy steroid can be carried out in the manner described hereinabove, thus giving the corresponding 9α-(fluoro or chloro)-11-keto steroid, e.g., 4-oxa-9α-(fluoro or chloro)-5α(or 5β)-pregnane-17α,21-diol-3,11,20-trione 21-acetate.

The ester group or groups in either the 9α-(fluoro or chloro)-11β-hydroxy steroid or the 9α-(fluoro or chloro)-11-keto steroid can be hydrolyzed in the manner described hereinabove to give the corresponding free hydroxy steroids, e.g., 4-oxa-9α-(fluoro or chloro)-5α(or 5β) - pregnane - 11β,17α,21-triol-3,20-dione or 4-oxa-9α-(fluoro or chloro)-5α(or 5β)pregnane-17α,21-diol-3,11,20-trione.

Similarly, a 16α,17α-cyclic acetal or ketal grouping can be hydrolyzed in known manner, e.g., using 60–90% formic acid, or the like, at reflux temperature, to give the corresponding free 16α,17α-diol.

In addition to being obtained from a 16α-hydroxy-containing starting material I, the 16α-hydroxyl derivatives can also be prepared by incubating the corresponding 16-desoxy steroid in known manner with oxygenating microorganisms such as *Streptomyces roseochromogenus* and the like.

The novel 5α-compounds of the present invention can also be prepared by the process illustrated as follows:

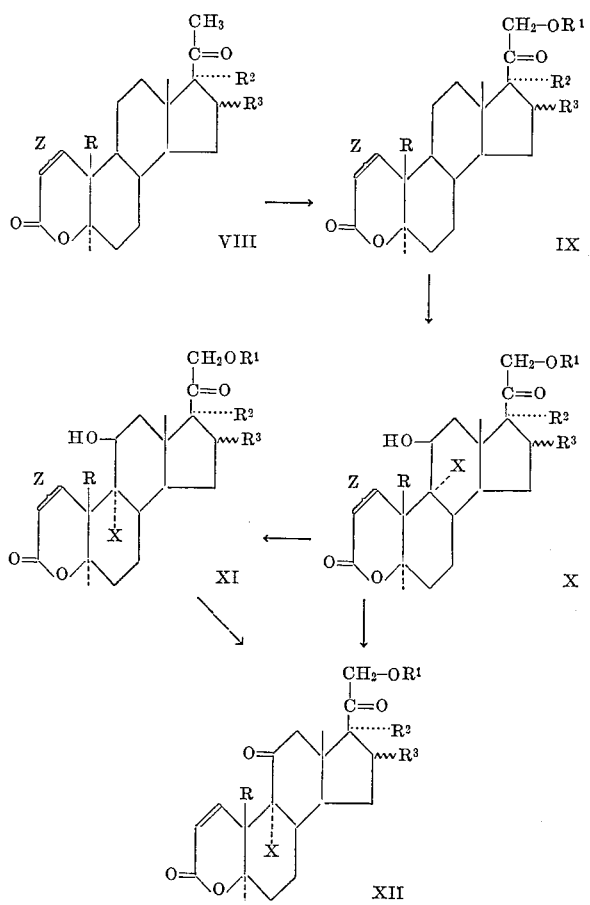

In the above formulae R, R¹, R², R³, X and Z have the same meaning as set forth hereinbefore.

The starting compounds for the above process VIII are 4 - oxa-3,20-diketo-17α-hydroxy-Δ¹-5α-pregnene and 5α-pregnene derivatives and may be obtained according to my copending U.S. patent applications Ser. No. 353,245 and Ser. No. 353,239 filed Mar. 19, 1964, both now abandoned, from the corresponding progesterone compounds by oxidation with ozone followed by hydrogen peroxide, then by conventional reduction with sodium borohydride and dehydrogenation with 2,3-dichloro-5,6-dicyano-1,4-benzoquinone for at least 48 hours, at reflux temperature in dioxane, to give the corresponding 4-oxa-Δ¹-5α-pregnen-20-ol-3-one and 5α-pregnane compounds, which upon conventional oxidation, preferably with chromium trioxide yield the desired starting compound VIII.

In carrying out the above described process, the starting compound VIII is treated with iodine in the presence of calcium oxide to give the corresponding 21-iodo-4-oxa-Δ¹ - 5α - pregnene-3,20-dione or 5α-pregnane derivative, which upon treatment with potassium acetate in a suitable solvent, preferably acetone, at reflux temperature for about 8 hours, affords the corresponding 21-acetoxy-4-oxa-Δ¹-5α-pregnene-3,20-dione or 5α-pregnane compound (IX; R¹=acetyl). The latter steroids upon treatment with adrenal glands under conventional conditions, afford the corresponding 4-oxa-Δ¹-5α-pregnene-11β,21-diol-3,20-dione or 5α-pregnane derivative (X; R¹=H) which upon conventional esterification, for example with acetic anhydride, affords the corresponding 21-acyl derivative (X; R¹=acyl). The latter 21-acylate is treated with mesyl chloride in dimethyl formamide to give the corresponding 4-oxa-Δ¹,9(11)-5α-pregnadiene or 5α-pregnane derivative which is then treated with N-bromo acetamide in the presence of perchloric acid under conventional conditions, to give the corresponding 9α-bromo-11β-hydroxy compound which, in turn, upon treatment with potassium acetate in acetone, preferably at reflux temperature for about 10 hours affords the corresponding 4-oxa-9β,11β-oxido-Δ¹-5α-pregnene-3,20-dione or 5α-pregnane compound. This 9β,11β-oxido compound is treated with a hydrogen halide, for example hydrogen fluoride or hydrogen chloride, under conventional conditions, to give the corresponding 4-oxa-9α-halo-Δ¹-5α-pregnene-11β,21-diol-3,20-dione 21-acylate or 5α-pregnane derivative (XI; R¹=acyl).

The 21-acyloxy-11β-hydroxy compounds (X, XI; R¹=acyl) are converted into the corresponding 21-acyloxy-11-keto compounds (XII; R¹=acyl) by conventional oxidation method, for example with chromium trioxide, in a variety of media for example in an acid medium, in pyridine or in other conventional media.

The compounds having a 21-acyloxy group are saponified by treatment with a mild base to produce the corresponding 21-free alcohols which, in turn, may be acylated conventionally in pyridine with an acylating agent to give the corresponding 21-acylates, wherein the acyl group may be different from the previously saponified one.

The 6-substituted derivatives of the final compounds of the present invention (X, XI, XII), e.g., the 6-methyl, 6-chloro and 6-fluoro derivatives may be prepared by the process described hereinbefore starting from the corresponding 6-substituted 4-oxa-3,20-diketo-Δ¹-5α-pregnene or 5α-pregnane derivative, which in turn may be prepared from the corresponding 6-substituted progesterone by the process described in my copending U.S. patent application Ser. No. 353,239 or Ser. No. 353,245 filed Mar. 19, 1964, both now abandoned.

The following specific examples serve to illustrate the present invention but are not intended to limit the scope thereof, unless so set forth in the appended claims. All parts and percentages are by weight, unless otherwise stated:

Preparation A

A culture of *Streptomyces roseochromogenus*, ATCC No. 3347, was prepared in an inclined agar medium containing 1% of glucose and 1% of yeast extract. 1 cc. of a suspension of the culture was then used to inoculate a series of 250 cc. Erlenmeyer flasks, each containing 50 cc. of a sterilized aqueous medium containing 2% of peptone and 5% of corn syrup. The resulting mixtures were then incubated, with aeration and constant shaking, at 28° C. for 48 hours, thus giving a vegetating culture of the microorganism.

10 mg. of Δ⁴-pregnene-17α,21-diol-3,20-dione were added to each 50 cc. of the vegetating culture of *Streptomyces roseochromogenus*, and the resulting mixtures were incubated, with aeration and constant stirring, for 72 hours. Following this reaction period the mixtures were combined and extracted several times with methylene dichloride. The extracts were then combined, washed with water, dried over anhydrous sodium sulfate, filtered, and the filtrate then evaporated to dryness under reduced pressure. Chromatography of the thus-obtained residue on silica gel gave Δ⁴-pregnene-16α,17α,21-triol-3,20-dione.

By repeating this procedure in every detail but one, namely, using 19-nor-Δ⁴-pregnene-17α,21-diol-3,20-dione as the steroid starting material, 19-nor-Δ⁴-pregnene-16α-17α,21-triol-3,20-dione was obtained.

Preparation B 40 cc. of an aqueous 37% solution of formaldehyde and 5 cc. of concentrated hydrochloric acid were added to a solution of 5 grams of Δ⁴-pregnene-17α,21-diol-3,20-dione in 200 cc. of chloroform, and the resulting reaction mixture was allowed to stand at room temperature, with stirring, for 48 hours. Following this reaction period the aqueous and organic layers were separated and the former was washed with chloroform. These washings were then added to the organic layer and the combined solution was washed with water until neutral, then dried over anhydrous sodium sulfate and evaporated to dryness. Recrystallization of the resulting residue from methanol/diethyl ether gave 17,20;20,21-bismethylenedioxy-Δ⁴-pregnen-3-one.

This procedure was then repeated using 19-nor-Δ⁴-pregnene - 17α,21-diol-3,20-dione, 16α-methyl-19-nor-Δ⁴-pregnene-17α,21-diol-3,20-dione, Δ⁴-pregnene-16α,17α,21-triol,-3,20-dione, and 19-nor-Δ⁴-pregnene-16α,17α,21-triol-3,20-dione, respectively, as the steroid starting materials. In each case, the corresponding 17,20;20,21-bismethylenedioxy derivative, namely, 17,20;20,21-bismethylenedioxy-19-nor - Δ⁴ - pregnen-3-one, 16α-methyl - 17,20;20,21-bismethylenedioxy-Δ⁴-pregnen-3-one, 17,20;20,21-methylenedioxy - Δ⁴ - pregnen-16α-ol-3-one, and 17,20;20,21-bismethylenedioxy - 19-nor-Δ⁴-pregnen-16α-ol-3-one, respectively, was obtained.

EXAMPLE I

A solution of 5 grams of 17,20;20,21-bismethylenedioxy-Δ⁴-pregnen-3-one, 50 cc. of glacial acetic acid and 50 cc. of ethyl acetate, contained in an ozonation tube, was cooled in an acetone-Dry Ice bath to about −70° C. At this point, a stream of ozone (0.024 mol/hour) was passed through the solution for 2 hours, following which 20 cc. of water and 3 cc. of 30% hydrogen peroxide were added, with vigorous stirring. The resulting mixture was stirred for 17 hours at room temperature, then allowed to stand at room temperature for 48 hours. Following this reaction period the reaction solution was concentrated to a small volume under reduced pressure on a steam bath, then diluted with 20 cc. of methanol and poured into water. The thus-obtained mixture was extracted with diethyl ether and the extract was then washed with water, dried over anhydrous sodium sulfate and evaporated to dryness. Chromatography of the resulting residue on alumina gave 17,20;20,21-bismethylenedioxy-3,5-secopregnan-5-one-3-oic acid.

By repeating this procedure using the remaining 17,20;20,21-bismethylenedioxy derivatives obtained as described in Preparation B hereinabove as the steroid starting materials, the corresponding 3,5-seco-5-one-3-oic acids, namely, 17,20;20,21 - bismethylenedioxy-19-nor-3,5-secopregnan-5-one-3-oic acid, 16α-methyl-17,20;20,21-bismethylenedioxy-3,5-secopregnan-5-one-3-oic acid, 17,20;20,21-bismethylenedioxy - 3,5 - secopregnan-16α-ol-5-one-3-oic acid, and 17,20;20,21 - bismethylenedioxy - 19-nor-3,5-secopregnan-16α-ol-5-one-3-oic acid, respectively, were obtained.

EXAMPLE II

A solution of 1 gram of sodium borohydride in 3 cc. of water was added to an ice-cold solution of 1 gram of 17,20;20,21 - bismethylenedioxy-3,5-secopregnan-5-one-3-oic acid in 120 cc. of dioxane, and the resulting reaction mixture was allowed to stand for 16 hours at 0° C. Following this reaction period the pH of the reaction mixture was adjusted to 1 by the addition of 6 N hydrochloric acid (this also served to decompose excess sodium borohydride present) and the resulting crystalline precipitate was collected by filtration. Recrystallization from acetone/hexane gave a mixture of 17,20;20,21-bismethylenedioxy-4-oxa-5α-pregnan-3-one and 17,20;20,21-bismethylenedioxy-4-oxa-5β-pregnan-3-one, which was then separated into the individual isomers by fractional crystallization.

This procedure was then repeated using the remaining 3,5 seco-5-one-3-oic acids prepared as described in Example I hereinabove as the steroid starting materials. In each case, the corresponding 4-oxa-5α (and 5β)-3-ones, namely 17,20;20,21-bismethylenedioxy - 4 - oxa-19-nor-5α (and 5β)-pregnan-3-one, 16α-methyl-17,20;20,21-bismethylenedioxy-4-oxa-5α (and 5β)-pregnan-3-one, 17,20;20,21-bismethylenedioxy-4-oxa-5α (and 5β)-pregnan-16α-ol-3-one, and 17,20;20,21-bismethylenedioxy-4-oxa-19-nor-5α (and 5β)-pregnan-16α-ol-3-one, respectively, were obtained, and were separated into the individual isomers by fractional crystallization.

EXAMPLE III

A mixture of 500 mg. of 17,20;20,21-bismethylenedioxy-4-oxa-5α-pregnen-3-one, 550 mg. of 2,3-dichloro-5,6-dicyano-1,4-benzoquinone and 10 cc. of dioxane was refluxed for 140 hours. Following this reaction period the reaction mixture was cooled to room temperature, the 2,3-dichloro-5,6-dicyano-1,4-benzohydroquinone formed during the reaction was removed by filteration and the filtrate then evaporated to dryness. The resulting residue was dissolved in chloroform and filtered through alumina to remove any remaining 2,3-dichloro-5,6-dicyano-1,4-benzohydroquinone, and the filtrate was then evaporated to dryness. Recrystallization from acetone/hexane gave 17,20;20,21 - bismethylenedioxy - 4-oxa-Δ¹-5α-pregnen-3-one.

By repeating this procedure in every detail but one, namely, using the remaining 4-oxa-5α (and 5β)-3-ones prepared as described in Example II hereinabove as the starting materials, the corresponding 4-oxa-Δ¹-5α (and 5β)-3-ones, namely, 17,20;20,21-bismethylenedioxy-4-oxa-19-nor-Δ¹-5α-pregnen-3-one, 16α-methyl-17,20;20,21-bismethylenedioxy-4-oxa-Δ¹-5α-pregnen-3-one, 17,20;20,21-bismethylenedioxy-4-oxa-Δ¹-5α-pregnen-16α-ol-3-one, 17,20;20,21 - bismethylenedioxy-4-oxa-19-nor-Δ¹-5α-pregnen-16α-ol-3-one, 17,20;20,21-bismethylenedioxy-4-oxa-Δ¹-5β-pregnen-3-one, 17,20;20,21-bismethylenedioxy-4-oxa-19-nor-Δ¹-5β-pregnen-3-one, 16α-methyl-17,20;20,21-bismethylenedioxy - 4-oxa-Δ¹-5β-pregnen-3-one, 17,20;20,21-bismethylenedioxy-4-oxa-Δ¹-5β-pregnen-16α-ol-3-one, and 17, 20;20,21 - bismethylenedioxy-4-oxa-19-nor-Δ¹-5β-pregnen-16α-ol-3-one, respectively, were obtained.

EXAMPLE IV 1 gram of 17,20;20,11-bismethylenedioxy-4-oxa-5α-pregnan-3-one was admixed with 20 cc. of aqueous 80% formic acid, and the resulting reaction mixture was heated at reflux temperature for 3 minutes. Following this reaction period the reaction mixture was cooled to room temperature and diluted with water, and the thus-formed precipitate was collected by filtration washed with water and dried. Recrystallization from acetone/hexane gave 4-oxa-5-pregnane-17α,21-diol-3,20-dione.

This procedure was then repeated using the remaining 4-oxa-5α (and 5β)-3-ones prepared as described in Example II hereinabove and the 4-oxa-Δ¹-5α (and 5β)-3-ones prepared as described in Example III hereinabove as the steroid starting materials. In each case, the corresponding free dihydroxy-acetone side chain-containing steroid, namely, 4-oxa-19-nor-5α-pregnane-17α,21-diol-3,20-dione, 4-oxa-16α-methyl-5α-pregnane-17α,21-diol-3,20-dione, 4-oxa - 5α-pregnane-16α,17α,21-triol-3,20-dione, 4-oxa-19-nor-5α-pregnane-16α,17α,21-triol-3,20-dione, 4-oxa-Δ¹-5α-pregnene-17α,21-diol-3,20-dione, 4-oxa-19-nor-Δ¹-5α-pregnene-17α,21-diol-3,20-dione, 4-oxa-16α-methyl-Δ¹-5α-pregnene - 17α,21-diol-3,20-dione, 4-oxa-Δ¹-5α-pregnene-16α, 17α,21-triol-3,20-dione, 4-oxa-19-nor-Δ¹-5α-pregnene-16α, 17α-21-triol-3,20-dione, 4-oxa-5β-pregnane-17α,21-diol-3, 20-dione, 4-oxa-19-nor-5β-pregnane-17α,21-diol-3,20-dione, 4 - oxa-16α-methyl-5β-pregnane-17α,21-diol-3,20-dione, 4-oxa-5β-pregnane-16α,17α,21-triol-3,20-dione, 4-oxa-19-nor-5β-pregnane-16α,17α,21-triol-3,20-dione, 4-oxa-Δ¹-5β-pregnene-17α,21-diol-3,20-dione, 4-oxa-19-nor-Δ¹-5β-pregnene-17α,21-diol-3,20-dione, 4-oxa-16α-methyl-Δ¹-5β-pregnene - 17α,21-diol-3,20-dione, 4-oxa-Δ¹-5β-pregnene-16α,17α,21-triol-3,20-dione, and 4-oxa-19-nor-Δ¹-5β-pregnene-16α,17α,21-triol-3,20-dione, respectively, was obtained.

EXAMPLE V

A mixture of 1 gram of 4-oxa-5α-pregnane-17α,21-diol-3,20-dione, 8 cc. of pyridine and 4 cc. of acetic anhydride was allowed to stand at room temperature overnight. Following this reaction period the reaction mixture was poured into ice water and the thus-formed precipitate was collected by filtration, washed with water and dried. Crystallization from acetone/hexane gave 4-oxa-5α-pregnane-17α,21-diol-3,20-dione-21-acetate.

By repeating this procedure using 4-oxa-5α-pregnane-16α,17α,21-triol-3,20-dione, 4-oxa-Δ¹-5α-pregnene-17α,21-diol-3,20-dione, 4-oxa-19-nor-Δ¹-5α-pregnene-17α-21-diol-3,20-dione, 4-oxa-5β-pregnane-17α,21-diol-3,20-dione, 4-oxa-5β-pregnane-16α,17α,21-triol-3,20-dione, 4-oxa-Δ¹-5β-pregnene-17α,21-diol-3,20-dione, 4-oxa-19-nor-Δ¹-5β-pregnene-17α,21-diol-3,20-dione, respectively, as the steroid starting materials. 4-oxa-5α-pregnane-16α,17α-21-triol-3, 20-dione 16,21-diacetate, 4-oxa-Δ¹-5α-pregnene-17α,21-diol-3,20-dione 21-acetate, 4-oxa-19-nor-Δ¹-5α-pregnene-17α,21-diol-3,20-dione 21-acetate, 4-oxa-5β-pregnane-17α, 21-diol-3,20-dione 21-acetate, 4-oxa-5β-pregnane-16α,17α, 21-triol-3,20-dione 16,21-diacetate, 4-oxa-Δ¹-5β-pregnene-17α,21-diol-3,20-dione 21-acetate, and 4-oxa-19-nor-Δ¹-5β-pregnene-17α,21-diol-3,20-dione 21-acetate, respectively, were obtained.

Similarly, by replacing acetic anhydride with propionic, caprioc, valeric and enanthic anhydride, and using each of the steroid starting materials just mentioned, the corresponding propionates, caproates, valerates and enanthates were obtained.

EXAMPLE VI

A solution of 500 mg. of 4-oxa-5α-pregnane-16α,17α-21-triol-3,20-dione in 100 cc. of dry acetone was admixed with 0.5 cc. of 72% perchloric acid, and the resulting reaction mixture was allowed to stand at room temperature, with stirring, for 1 hour. Following this reaction period the reaction mixture was washed with an aqueous sodium bicarbonate solution and then with water until neutral, then steam distilled and the product extracted with methylene dichloride. The resulting extract was then dried over anhydrous sodium sulfate and evaporated to dryness. Recrystallization of the residue from acetone/hexane gave 4 - oxa - 16α-17α-isopropylidenedioxy-5α-pregnan-21-ol-3, 20-dione.

By repeating this procedure in every detail but one, namely, using 4-oxa-5β-pregnane-16α,17α,21-triol-3,20-dione as the steroid starting material, 4-oxa-16α,17α-isopropylidenedioxy-5β-pregnan-21-ol-3,20-dione was obtained.

Example VII

The following solutions "A," "B" and "C" were prepared using distilled water as the solvent.

Solution "A" was prepared by mixing 425 cc. of a 1.742% dipotassium hydrogen phosphate ($K_2HPO_4$) solution with 75 cc. of a 1.38% monosodium dihydrogen phospate ($NaH_2PO_4$) solution.

Solution "B" was prepared by diluting a mixture of 1 liter of a 4.5% sodium chloride solution, 40 cc. of a 5.75% potassium chloride solution and 10 cc. of 19.1% magnesium sulfate solution to a volume of 5 liters.

Solution "C" was prepared by dissolving 20.9 grams of fumaric acid and 14.4 grams of sodium hydride in 1 liter of water and then diluting the solution to 1.2 liters.

Then 475 cc. of solution "A," 4.32 liters of solution "B" and all of solution "C" were mixed.

Defatted adrenal glands of recently slaughtered cattle were ground in a meat grinder until a homogeneous mass was obtained. To 1 kilogram of this mass there was then added, with vigorous stirring, 2 liters of the mixture of solutions "A," "B" and "C," followed by 1 gram of 4-oxa - 5α - pregnane - 17α,21 - diol - 3,20 - dione dissolved in 5.35 parts, based on the weight of the steroid, of propylene glycol. The resulting mixture was stirred at 37° C. for 3 hours following which 13 liters of acetone were added and the mixture was stirred at room temperature for an additional hour. At this point, the acetone extract was separated by filtration, the filter cake was washed with 6 liters of acetone, the washings were combined with the filtrate, and the solvent was then removed by distillation under reduced pressure. Chromatography on alumina followed by crystallization of the solid fractions from methylene dichloride/acetone gave 4 - oxa - 5α - pregnane - 11β,17α,21 - triol - 3,20 - dione.

By repeating this procedure using the remaining compounds prepared as described in Example IV hereinabove, the corresponding 11β - hydroxy steroids, namely, 4 - oxa - 19 - nor - 5α - pregnane - 11β,17α,21-triol - 3,20 - dione, 4 - oxa - 16α - methyl - 5α - pregnane - 11β,17α,21 - triol - 3,20 - dione, 4 - oxa - 5α-pregnane - 11β,16α,17α,21 - tetrol - 3,20 - dione, 4 - oxa-19 - nor - 5α - pregnane - 11β,16α,17α,21 - tetrol - 3, 20-dione, 4-oxa-Δ¹-5α-pregnene-11β,17α,21-triol-3,20, dione, 4-oxa-19-nor-Δ¹-5α-pregnene-11β,17α,21-triol-3,20, dione, 4-oxa-16α-methyl-Δ¹-5α-pregnene-11β,17α,21-triol-3,20-dione, 4-oxa-Δ¹-5α-pregnene-11β,16α,17α,21-tetrol-3,20 - dione, and 4 - oxa - 19 - nor - Δ¹ - 5α - pregnene - 11β,16α,17α,21 - tetrol - 3,20 - dione, 4 - oxa - 5β-pregnane - 11β,17α,21 - triol - 3,20 - dione, 4 - oxa - 19-nor - 5β - pregnane - 11β,17α,21 - triol - 3,20 - dione, 4-oxa - 16α - methyl -5β - pregnane - 11β,17α,21 - triol-3,20 - dione, 4 - oxa - 5β - pregnane - 11β,16α,17α,21-tetrol - 3,20 - dione, 4 - oxa - 19 - nor - 5β - pregnane-11β,16α,17α,21 - tetrol - 3,20 -dione, 4 - oxa - Δ¹ - 5β-pregnene - 11β,17α,21 - triol - 3,20 - dione, 4 - oxa - 19-nor - Δ¹ - 5β - pregnene - 11β,17α,21 - triol - 3,20 - dione, 4 - oxa - 16α - methyl - Δ¹ - 5β - pregnene - 11β,17α,21-triol - 3,20 - dione, 4 - oxa - Δ¹ - 5β - pregnene - 11β, 16α,17α,21 - tetrol - 3,20 - dione, and 4 - oxa - 19 - nor-Δ¹ - 5β - pregnene - 11β,16α,17α,21 - tetrol - 3-20 - dione, respectively, were obtained.

EXAMPLE VIII

The procedure of Example VI hereinabove was repeated using 4 - oxa - 5α - pregnane - 11β,16α,17α,21-tetrol - 3,20 - dione, 4 - oxa - 5β - pregnane - 11β,16α, 17α,21 - tetrol - 3,20 - dione, 4 - oxa - Δ¹ - 5α - pregnene - 11β,16α,17α,21 - tetrol - 3,20 - dione, and 4-oxa - Δ1 - 5β - pregnene - 11β,16α,17α,21 - tetrol - 3,20-dione as the steroid starting materials, thus giving 4-oxa-16α,17α-isopropylidenedioxy - 5α - pregnane - 11β,21-diol - 3,20 - dione, 4 - oxa - 16α,17α,isopropylidenedioxy - 5β - pregnane - 11β,21 - diol - 3,20 - dione, 4 - oxa-16α,17α - isopropylidenedioxy - Δ¹ - 5α - pregnene - 11β, 21 - diol - 3,20 - dione, and 4 - oxa - 16α,17α - isopropylidenedioxy - Δ¹ - 5β - pregnene - 11β,21 - diol - 3, 20-dione, respectively.

EXAMPLE IX

The procedure of Example V hereinabove was repeated using 4 - oxa - 5α - pregnane - 11β,17α,21 - triol - 3, 20 - dione, 4 - oxa - 16α - methyl - 5α - pregnane - 11β, 17α,21 - triol - 3,20 - dione, 4 - oxa - 19 - nor - 5α - pregnane - 11β,16α,17α,21 - tetrol - 3,20 - dione, 4 - oxa-Δ$^1$ - 5α - pregnene - 11β,17α,21 - triol - 3,20 - dione, 4-oxa - 16α,17α - isopropylidenedioxy - 5α - pregnane - 11β, 21 - diol - 3,20 - dione, 4 - oxa - 16α,17α - isopropylidenedioxy - Δ$^1$ - 5α - pregnene - 11β,21 - diol - 3,20- dione, and the corresponding 5β-isomers, respectively, as the steroid starting materials. In each case, the corresponding 21-acetate or 16,21-diacetate, namely, 4-oxa-5α, pregnane - 11β,17α,21 - triol - 3,20 - dione 21 - acetate, 4 - oxa - 16α - methyl - 5α - pregnane - 11β,17α,21 - triol-3,20 - dione - 21 - acetate, 4 -oxa - 19 - nor - 5α - pregnane - 11β,16α,17α,21 - tetrol - 3,20 - dione 16,17 - diacetate, 4 - oxa - Δ$^1$ - 5α - pregnene - 11β,17α,21 - triol-3,20 - dione 21 - acetate, 4 - oxa - 16α,17α - isopropylidenedioxy - 5α - pregnane - 11β,21 - diol - 3,20 - dione 21 - acetate, 4 - oxa - 16α,17α - isopropylidenedioxy-Δ$^1$ - 5α - pregnene - 11β,21 - diol -3,20 - dione 21 - acetate, 4 - oxa - 5β - pregnane - 11β,17α,21 - triol - 3,20- dione 21 - acetate, 4 - oxa - 16α - methyl - 5β - pregnane - 11β,17α,21 - triol - 3,20 - dione 21 - acetate, 4-oxa - 19 - nor - 5β - pregnane - 11β,16α,17α,21 -tetrol-3,20 - dione 16,21 diacetate, 4 - oxa - Δ$^1$ - 5β - pregnene - 11β,17α,21 - triol - 3,20 - dione 21 - acetate, 4-oxa - 16α,17α - isopropylidenedioxy - 5β - pregnane - 11β, 21 - diol - 3,20 - dione 21 - acetate, and 4 - oxa - 16α, 17α - isopropylidenedioxy - Δ1 - 5β - pregnene - 11β,21-diol - 3,20 - dione 21 - acetate, respectively, was obtained.

EXAMPLE X

A solution of 1 gram of 4-oxa-5α-pregnane-11β,17α, 21-triol-3,20-dione 21-acetate in 20 cc. of pyridine was admixed with 1 gram of chromium trioxide in 20 cc. of pyridine, and the resulting reaction mixture was allowed to stand at room temperature overnight. Following this reaction period the reaction mixture was diluted with ethyl acetate and then filtered through Celite. The thus-obtained filtrate was washed thoroughly with water, then dried over anhydrous sodium sulfate and evaporated to dryness. Crystallization of the resulting residue from acetone/hexane gave 4-oxa-5α-pregnane-17α,21-diol-3,11,20-trione 21-acetate.

By repeating this procedure using the remaining esters prepared as described in Example IX hereinabove as the steroid starting materials the corresponding 11-keto steroids, namely, 4 - oxa - 16α - methyl - 5α - pregnane-17α,21 - diol - 3,11,20 - trione 21 - acetate, 4 - oxa - 19-nor - 5α - pregnane -16α,17α,71 - triol - 3,11,20 - trione 16,21 - diacetate, 4 - oxa - Δ$^1$ - 5α - pregnene - 17α,21-diol - 3,11,20 - trione 21 - acetate, 4 - oxa - 16α,17α-diisopropylidenedioxy - 5α - pregnan - 21 - ol - 3,11,20-trione 21 - acetate, 4 - oxa - 16α,17α - isopropylidenedioxy - Δ$^1$ - 5α - pregnene - 21 - ol - 3,11,20 - trione 21-acetate, 4 - oxa - 5β - pregnane - 17α,21 - diol - 3,11,20-trione 21 - acetate, 4 - oxa - 16α - methyl - 5β - pregnane - 17α,21 - diol - 3,11,20 - trione 16,21 - diacetate, 4 - oxa - 19 - nor - 5β - pregnane - 16α,17α,21 - triol - 3, 11,20 - trione 16,21 - diacetate, 4 - oxa - Δ$^1$ - 5β - pregnene - 17α,21 - diol - 3,11,20 - trione 21 - acetate, 4-oxa - 16α,17α - isopropylidenedioxy - 5β - pregnan - 21-ol - 3,11,20 - trione 21 - acetate, and 4 - oxa - 16α, 17α - isopropylidenedioxy - Δ$^1$ - 5β - pregnen - 21 - ol-3,11,20 - trione 21 - acetate, respectively, were obtained.

EXAMPLE XI

A solution of 1 gram of 4-oxa-5α-pregnane-17α,21-diol-3,11,20-trione 21-acetate in 90 cc. of methanol, contained under an inert nitrogen atmosphere, was cooled to 10° C. and admixed with a cooled solution of 2 grams of potassium bicarbonate in 10 cc. of water, and the resulting reaction mixture was allowed to stand at 10° C. for 12 hours. Following this reaction period the reaction mixture was diluted with water and the thus-formed precipitate was collected by filtration, washed with water until neutral and dried. Recrystallization from acetone/hexane gave 4-oxa-5α-pregnane-17α,21-diol-3,11,20-trione.

This procedure was then repeated using the remaining 11-keto 21-acetates and 16,21-diacetates prepared as described in Example X hereinabove as the steroid starting materials. In each case, the corresponding free hydroxy steroids, namely, 4 - oxa - 16α - methyl - 5α - pregnane-17α,21 - diol-3,11,20-trione, 4-oxa - 19 - nor - 5α-pregnane-16α,17α,21 - triol - 3,11,20 - trione, 4-oxa-Δ$^1$-5α-pregnene-17α,21 - diol - 3,11,20 - trione, 4-oxa - 16α,17α-isopropylidenedioxy - 5α - pregnane - 21-ol-3,11,20-trione, 4-oxa-16α,17α - isopropylidenedioxy - Δ$^1$ - 5α-pregnene - 21-ol-3,11,20-trione, 4-oxa - 5β - pregnane - 17α,21-diol-3,11,20-trione, 4-oxa - 16α - methyl - 5β - pregnane-17α,21-diol-3,11,20-trione, 4-oxa - 19 - nor - 5β-pregnane - 16α,17α,21-triol - 3,11,20 - trione, 4-oxa - Δ$^1$ - 5β - pregnene-17α,21-diol-3,11,20-trione, 4-oxa - 16α,17α - isopropylidenedioxy-5β-pregnan - 21-ol - 3,11,20-trione, and 4-oxa-16α,17α-isopropylidenedioxy - Δ$^1$ - 5β-pregnen-21-ol-3,11,20-trione, respectively, was obtained.

EXAMPLE XII

One gram of 4-oxa - 5α-pregnane-11β,17α,21-triol-3,20-dione 21-acetate was dissolved with slow heating in 12.5 cc. of dimethylformamide. The resulting solution was then cooled to room temperature and admixed with 0.42 gram of mesyl chloride and 0.5 cc. of pyridine, and the resulting reaction mixture was then heated to 80° C. and held at that temperature for 30 minutes. Following this reaction period the reaction mixture was cooled to room temperature, then diluted with water, and the product was extracted with ethyl acetate. The thus-obtained extract was washed with water, dried over anhydrous sodium sulfate and the solvent evaporated under reduced pressure. Recrystallization of the resulting residue from acetone/hexane gave 4-oxa - Δ$^{9(11)}$-5α-pregnene - 17α,21 - diol - 3,20/dione 21-acetate.

By repeating this procedure using the remaining 11β-hydroxy-21-acetates and 16,21-diacetates prepared as described in Example IX hereinabove as the steroid starting materials, the corresponding 9(11)-dehydro steroids, namely, 4-oxa - 16α-methyl - Δ$^{9(11)}$ - 5α - pregnene-17α,21-diol - 3,20-dione 21-acetates, 4 - oxa - 19-nor-Δ$^{9(11)}$-5α-pregnene - 16α, 17α,21-triol - 3,20-dione 16,21-diacetate, 4-oxa - Δ$^{1,9(11)}$ - 5α - pregnadiene-17α,21-diol-3,20-dione 21-acetate, 4-oxa - 16α,17α - isopropylidenedioxy - Δ$^{9(11)}$-5α-pregnen - 21-ol - 3,20-dione 21-acetate, 4-oxa-16α,17α-isopropylidenedioxy - Δ$^{1,9(11)}$ - 5α - pregnadien-21-ol-3,20-dione 21-acetate, 4-oxa - Δ$^{9(11)}$ - 5β - pregnene-17α,21-diol-3,20-dione 21-acetate, 4-oxa - 16α - methyl-Δ$^{9(11)}$-5β-pregnene-17α,21 - diol - 3,20-dione 21-acetate, 4-oxa-19-nor-Δ$^{9(11)}$-5β-pregnene - 16α,17α,21 - triol - 3,20-dione 16,21-diacetate, 4-oxa - Δ$^{1,9(11)}$ - 5β - pregnadiene - 17α,21-diol - 3,20-dione 21-acetate, 4-oxa - 16α,17α-isopropylidenedioxy - Δ$^{9(11)}$ - 5β - pregnen - 21-ol-3,20-dione 21-acetate, and 4-oxa - 16α,17α - isopropylidenedioxy-Δ$^{1,9(11)}$-5β-pregnadiene-21-ol-3,20-dione 21- acetate, respectively, were obtained.

EXAMPLE XIII

Seven grams of N-bromoacetamide were added, with stirring and excluding light, over a 1 hour period at room temperature to a mixture of 12.5 grams of 4-oxa-Δ$^{9(11)}$-5α-pregnene - 17α,21-diol - 3,20-dione 21-acetate and 2 cc. of 0.4 N perchloric acid in 125 cc. of purified dioxane. Following this addition the resulting reaction mixture was stirred for an additional hour at room temperature, then treated with an aqueous 10% sodium sulfite solution until the mixture no longer turned potassium-starch indicator paper blue. Ice was then added, and the mixture was extracted with chloroform. The thus-obtained extract was washed with water, then with an aqueous 5% sodium bicarbonate solution and finally with water, then distilled under vacuum to remove the solvent. Trituration of the resulting residue with acetone followed by crystallization from acetone/hexane gave 4-oxa-9α-bromo-5α-pregnane-11β,17α,21-triol-3,20-dione 21-acetate.

This procedure was then repeated using the remaining 9(11)-dehydro steroids prepared as described in Example XII hereinabove as the steroid starting materials. In each case, the corresponding bromohydrin, namely, 4-oxa-9α-bromo - 16α - methyl - 5α - pregnane-11β,17α,21-triol-3,20-dione 21-acetate, 4-oxa - 9α - bromo - 19-nor-5α-pregnane - 11β,16α,17α,21 - tetrol - 3,20-dione 16,21-diacetate, 4-oxa - 9α - bromo - Δ¹-5α-pregnene-11β,17α,21-triol - 3,20 -dione 21-acetate, 4-oxa - 9α - bromo-16α,17α, isopropylidenedioxy - 5α - pregnane - 11β,21-diol - 3,20-dione 21-acetate, 4-oxa - 9α - bromo - 16α,17α-isopropylidenedioxy - Δ¹ - 5α - pregnene-11β,21-diol-3,20-dione 21-acetate, 4-oxa - 9α - bromo - 5α-pregnane - 11β,17α,21-triol - 3,20-dione 21-acetate, 4-oxa - 9α - bromo - 16α-methyl - 5β - pregnane - 11β,17α,21-triol - 3,20-dione 21-acetate, 4-oxa - 9α - bromo - 19 - nor - 5β - pregnane-11β,16α,17α,21-tetrol - 3,20-dione 16,21-diacetate, 4-oxa-9α-bromo - Δ¹ - 5β - pregnene - 11β,17α,21-triol-3,20-dione 21-acetate, 4-oxa - 9α - bromo - 16α,17α-isopropylidenedioxy - 5β - pregnane-11β,21-diol - 3,20-dione 21-acetate, and 4-oxa - 9α - bromo - 16α,17α-isopropylidenedioxy - Δ¹ - 5β-pregnene-11β,21-diol-3,20-dione 21-acetate, respectively, was obtained.

EXAMPLE XIV

The bromohydrins prepared as described in Example XIII hereinabove were oxidized with chromium trioxide in pyridine in the manner described in Example X hereinabove, thus giving 4-oxa-9α-bromo - 5α - pregnane-17α,21-diol - 3,11,20-trione 21-acetate, 4-oxa - 9α - bromo-16α-methyl - 5α - pregnane - 17α,21-diol-3,11,20-trione 21-acetate, 4-oxa - 9α - bromo - 19-nor - 5α - pregnane-16α,17α,21-triol - 3,11,20 - trione 16,21-diacetate, 4-oxa-9α-bromo - Δ¹ - 5α - pregnene-17α,21-diol-3,11,20-trione 21-acetate, 4-oxa - 9α-bromo - 16α,17α - isopropylidenedioxy-5α-pregnan - 21-ol-3,11,20-trione 21-acetate, and 4-oxa-9α-bromo - 16α,17α - isopropylidenedioxy - Δ¹-5α-pregnen-21-ol-3,11,20-trione 21-acetate, respectively, as well as the corresponding 5β-isomers.

EXAMPLE XV

The bromohydrins prepared as described in Example XIII hereinabove and the 9α-bromo-11-keto steroids prepared as described in Example XIV hereinabove were hydrolyzed in the manner described in Example XI hereinabove thus giving 4-oxa-9α-bromo-5α-pregnane-11β,17α,21-triol-3,20-dione,
4-oxa-9α-bromo-16α-methyl-5α-pregnane-11β,17α,21-triol-3,20-dione,
4-oxa-9α-bromo-19-nor-5α-pregnane-11β,16α,17α,21-tetrol-3,20-dione,
4-oxa-9α-bromo-Δ¹-5α-pregnene-11β,17α,21-triol-3,20-dione,
4-oxa-9α-bromo-16α,17α-isopropylidenedioxy-5α-pregnane-11β,21-diol-3,20-dione,
4-oxa-9α-bromo-16α,17α-isopropylidenedioxy-Δ¹-5α-pregnene-11β,21-diol-3,20-dione,
4-oxa-9α-bromo-5α-pregnane-17α,21-diol-3,11,20-trione,
4-oxa-9α-bromo-16α-methyl-5α-pregnane-17α,21-diol-3,11,20-trione,
4-oxa-9α-bromo-19-nor-5α-pregnane-16α,17α,21-triol-3,11,20-trione,
4-oxa-9α-bromo-Δ¹-5α-pregnene-17α,21-diol-3,11,20-trione,
4-oxa-9α-bromo-16α,17α-isopropylidenedioxy-5α-pregnan-21-ol-3,11,20-trione, and
4-oxa-9α-bromo-16α,17α-isopropylidenedioxy-Δ¹-5α-pregnen-21-ol-3,11,20-trione, respectively, as well as the corresponding 5β-isomers.

EXAMPLE XVI

A mixture of 10 grams of potassium acetate and 100 cc. of acetone was heated almost to boiling. To this heated mixture there was then slowly added, with stirring, a solution of 8.5 grams of 4-oxa-9α-bromo-5α-pregnane-11β,17α,21-triol-3,20-dione 21-acetate in 100 cc. of acetone, and the resulting reaction mixture was then refluxed for 10 hours. Following this reaction period the reaction mixture was distilled to remove nearly all the acetone. Ice water was then added to the residue and the thus-formed precipitate was collected by filtration, washed with water and dried. Recrystallization from methylene dichloride/hexane gave 4-oxa-9β,11β-oxido-5α-pregnane-17α,21-diol-3,20-dione 21-acetate.

By repeating this procedure using the remaining bromohydrins prepared as described in Example XIII hereinabove as the steroid starting materials, the corresponding 9β,11β-oxido steroids, namely, 4-oxa-9β,11β-oxido-16α-methyl-5α-pregnane-17α,21-diol-3,20-dione 21-acetate,
4-oxa-9β,11β-oxido-19-nor-5α-pregnane-16α,17α,21-triol-3,20-dione 16,21-diacetate,
4-oxa-9β,11β-oxido-Δ¹-5α-pregnene-17α,21-diol-3,20-dione 21-acetate,
4-oxa-9β,11β-oxido-16α,17α-isopropylidenedioxy-5α-pregnan-21-ol-3,20-dione 21-acetate,
4-oxa-9β,11β-oxido-16α,17α-isopropylidenedioxy-Δ¹-5α-pregnen-21-ol-3,20-dione 21-acetate,
4-oxa-9β,11β-oxido-5β-pregnane-17α,21-diol-3,20-dione 21-acetate,
4-oxa-9β,11β-oxido-16α-methyl-5β-pregnane-17α,21-diol-3,20-dione 21-acetate,
4-oxa-9β,11β-oxido-19-nor-5β-pregnane-11β,16α,17α,21-tetrol-3,20-dione 16,21-diacetate,
4-oxa-9β,11β-oxido-Δ¹-5β-pregnene-17α,21-diol-3,20-dione 21-acetate,
4-oxa-9β,11β-oxido-16α,17α-isopropylidenedioxy-5β-pregnan-21-ol-3,20-dione 21-acetate, and
4-oxa-9β,11β-oxido-16α,17α-isopropylidenedioxy-Δ¹-5β-pregnen-21-ol-3,20-dione 21-acetate, respectively, were obtained.

EXAMPLE XVII

A solution of 1.8 grams of 4-oxa-9β,11β-oxido-5α-pregnane-17α,21-diol-3,20-dione 21-acetate in 30 cc. of anhydrous methylene dichloride was placed in a polyethylene flask having a magnetic stirrer and cooled to 0° C. A solution of 2.11 grams of anhydrous hydrogen fluoride in 3.7 cc. of tetrahydrofuran, cooled in a Dry Ice-acetone bath to −70° C., was then added, with stirring, over a 20 minute period. Following this addition the reaction mixture was stirred, keeping the temperature below 10° C., for 6 hours. Next, the reaction mixture was neutralized by the cautious addition of aqueous 5% sodium bicarbonate solution, then transferred to a separate funnel. The organic layer was then separated, washed with water, dried over anhydrous sodium sulfate and concentrated by heating until an abundant precipitate formed. The mixture was then cooled to room temperature and the precipitate collected by filtration and redissolved in hot ethyl acetate. The insoluble material present in the ethyl acetate solution was removed by filtration, and the filtrate was then cooled and the crystalline material formed recovered by filtration, thus giving 4-oxa-9α-fluoro-5α-pregnane-11β,17α,21-triol-3,20-dione 21-acetate.

This procedure was then repeated using the remaining 9β,11β-oxido steroids prepared as described in Example XVI hereinabove as the steroid starting materials. In each case, the corresponding 9α-fluoro-11β-hydroxy steroid, namely, 4-oxa-9α-fluoro-16α-methyl-5α-pregnane-11β,17α,21-triol-
  3,20-dione 21-acetate,
4-oxa-9α-fluoro-19-nor-5α-pregnane-11β,16α,17α,21-
  tetrol-3,20-dione 16,21-diacetate,
4-oxa-9α-fluoro-Δ¹-5α-pregnene-11β,17α,21-triol-3,20-
  dione 21-acetate,
4-oxa-9α-fluoro-16α,17α-isopropylidenedioxy-5α-pregnane-
  11β,21-diol-3,20-dione 21-acetate,
4-oxa-9α-fluoro-16α,17α-isopropylidenedioxy-Δ¹-5α-
  pregnene-11β,21-diol-3,20-dione 21-acetate,
4-oxa-9α-fluoro-5β-pregnane-11β,17α,21-triol-3,20-dione
  21-acetate,
4-oxa-9α-fluoro-16α-methyl-5β-pregnane-11β,17α,21-triol-
  3,20-dione 21-acetate,
4-oxa-9α-fluoro-19-nor-5β-pregnane-11β,16α,17α,21-
  tetrol-3,20-dione 16,21-diacetate,
4-oxa-9α-fluoro-Δ¹-5β-pregnene-11β,17α,21-triol-3,20-
  dione 21-acetate,
4-oxa-9α-fluoro-16α,17α-isopropylidenedioxy-5β-pregnane-
  11β,21-diol-3,20-dione 21-acetate, and
4-oxa-9α-fluoro-16α,17α-isopropylidenedioxy-Δ¹-5β-
  pregnene-11β,21-3,20-dione 21-acetate, respectively, was obtained.

EXAMPLE XVIII 30 cc. of a 0.45 N solution of anhydrous hydrogen chloride in chloroform were added, with stirring, over a 35 minute period to a solution of 4 grams of 4-oxa-9β,11β-oxido-5α-pregnane-17α,21-diol-3,20-dione 21-acetate in 40 cc. of anhydrous chloroform, the temperature being maintained at 0° C. during this addition, and the resulting reaction mixture was then held at 0° C., with stirring, for an additional hour. Following this reaction period the reaction mixture was diluted with water and the chloroform layer was separated, washed with an aqueous sodium bicarbonate solution and then with water, then dried over anhydrous sodium sulfate and evaporated to dryness under reduced pressure. Crystallization of the resulting residue from acetone/hexane gave 4-oxa-9α-chloro-5α-pregnane-11β,17α,21-triol-3,20-dione 21-acetate.

By repeating this procedure using the remaining 9β,11β-oxido steroids prepared as described in Example XVI hereinabove as the steroid starting materials, the corresponding 9α-chloro-11β-hydroxy steroids, namely, 4-oxa-9α-chloro-16α-methyl-5α-pregnane-11β,17α,21-
  triol-3,20-dione 21-acetate,
4-oxa-9α-chloro-19-nor-Δ⁵-pregnane-11β,16α,17α,21-
  tetrol-3,20-dione 16,21-diacetate,
4-oxa-9α-chloro-Δ¹-5α-pregnene-11β,17α,21-triol-
  3,20-dione 21-acetate,
4-oxa-9α-chloro-16α,17α-isoproplidenedioxy-5α-
  pregnane-11β,21-diol-3,20-dione 21-acetate,
4-oxa-9α-chloro-16α,17α-isopropylidenedioxy-Δ¹-5α-
  pregnene-11β,21-diol-3,20-dione 21-acetate,
4-oxa-9α-chloro-5β-pregnane-11β,17α,21-triol-3,20-
  dione 21-acetate,
4-oxa-9α-chloro-16α-methyl-5β-pregnane-11β,17α,21-
  triol-3,20-dione 21-acetate,
4-oxa-9α-chloro-19-nor-5β-pregnane-11β,16α,17α,21-
  tetrol-3,20-dione 16,21-diacetate,
4-oxa-9α-chloro-Δ¹-5β-pregnene-11β,17α,21-triol-3,20-
  dione 21-acetate,
4-oxa-9α-chloro-16α,17α-isopropylidenedioxy-5β-pregnane-
  11β,21-diol-3,20-dione 21-acetate, and
4-oxa-9α-chloro-16α,17α-isopropylidenedioxy-Δ¹-5β-
  pregnene-11β,21-diol-3,20-dione 21-acetate, respectively, were obtained.

EXAMPLE XIX

The 9α-fluoro-11β-hydroxy and 9α-chloro-11β-hydroxy steroids prepared as described in Examples XVII and XVIII hereinabove were oxidized with chromium trioxide in pyridine in the manner described in Example X hereinabove, thus giving 4-oxa-9α-fluoro-5α-pregnane-17α,21-diol-3,11,20-trione
  21-acetate,
4-oxa-9α-fluoro-16α-methyl-5α-pregnane-17α,21-diol-3,
  11,20-trione 21-acetate,
4-oxa-9α-fluoro-19-nor-5α-pregnane-16α,17α,21-triol-
  3,11,20-trione 16,21-diacetate,
4-oxa-9α-fluoro-Δ¹-5α-pregnene-17α,21-diol-3,11,20-
  trione 21-acetate,
4-oxa-9α-fluoro-16α,17α-isopropylidenedioxy-5α-
  pregnan-21-ol-3,11,20-trione 21-acetate,
4-oxa-9α-fluoro-16α,17α-isopropylidenedioxy-Δ¹-5α-
  pregnen-21-ol-3,11,20-trione 21-acetate,
4-oxa-9α-chloro-5α-pregnane-17α,21-diol-3,11,20-
  trione 21-acetate,
4-oxa-9α-chloro-16α-methyl-5α-pregnane-17α,21-diol-
  3,11,20-trione 21-acetate,
4-oxa-9α-chloro-19-nor-5α-pregnane-16α,17α,21-triol-
  3,11,20-trione 16,21-diacetate,
4-oxa-9α-chloro-Δ¹-5α-pregnene-17α,21-diol-3,11,20-
  trione 21-acetate,
4-oxa-9α-chloro-16α,17α-isopropylidenedioxy-5α-pregnan-21-ol-3,11,20-trione 21-acetate, and
4-oxa-9α-chloro-16α,17α-isopropylidenedioxy-Δ¹-5α-
  pregnen-21-ol-3,11,20-trione 21-acetate, respectively, as well as the corresponding 5β-isomers.

EXAMPLE XX

The 9α-(fluoro and chloro)-11β-hydroxy steroids and the 9α-(fluoro and chloro)-11-keto steroids prepared as described in Examples XVII, XVIII and XIX hereinabove were hydrolyzed in the manner described in Example XI hereinabove, thus giving 4-oxa-9α-fluoro-5α-pregnane-11β,17α,21-triol-3,20-
  dione,
4-oxa-9α-fluoro-16α-methyl-5α-pregnane-11β,17α,21-
  triol-3,20-dione,
4-oxa-9α-fluoro-19-nor-5α-pregnane-11β,16α,17α,21-
  tetrol-3,20-dione,
4-oxa-9α-fluoro-Δ¹-5α-pregnene-11β,17α,21-triol-3,20-
  dione,
4-oxa-9α-fluoro-16α,17α-isopropylidenedioxy-5α-preg-
  nane-11β,21-diol-3,20-dione,
4-oxa-9α-fluoro-16α,17α-isopropylidenedioxy-Δ¹-5α-preg-
  nene-11β,21-diol-3,20-dione,
4-oxa-9α-fluoro-5α-pregnane-17α,21-diol-3,11,20-trione,
4-oxa-9α-fluoro-16α-methyl-5α-pregnane-17α,21-diol-
  3,11,20-trione,
4-oxa-9α-fluoro-19-nor-5α-pregnane-16α,17α,21-triol-
  3,11,20-trione,
4-oxa-9α-fluoro-Δ¹-5α-pregnene-17α,21-diol-3,11,20-
  trione,
4-oxa-9α-fluoro-16α,17α-isopropylidenedioxy-5α-preg-
  nan-21-ol-3,11,20-trione,
4-oxa-9α-fluoro-16α,17α-isopropylidenedioxy-Δ¹-5α-
  pregnen-21-ol-3,11,20-trione,
4-oxa-9α-chloro-5α-pregnane-11β,17α,21-triol-3,20-
  dione,
4-oxa-9α-chloro-16α-methyl-5α-pregnane-11β,17α,21-
  triol-3,20-dione,
4-oxa-9α-chloro-19-nor-5α-pregnane-11β,16α,17α,21-
  tetrol-3,20-dione,
4-oxa-9α-chloro-Δ¹-5α-pregene-11β,17α,21-triol-3,20-
  dione,
4-oxa-9α-chloro-16α,17α-isopropylidenedioxy-5α-preg-
  nane-11β,21-diol-3,20-dione,
4-oxa-9α-chloro-16α,17α-isopropylidenedioxy-Δ¹-5α-
  pregnene-11β,21-diol-3,20-dione,
4-oxa-9α-chloro-5α-pregnane-17α,21-diol-3,11,20-trione,
4-oxa-9α-chloro-16α-methyl-5α-pregnene-17α,21-diol-
  3,11,20-trione,
4-oxa-9α-chloro-19-nor-5α-pregnane-16α,17α,21-triol-
  3,11,20-trione,
4-oxa-9α-chloro-16α,17α-isopropylidenedioxy-5α-preg-
  nan-21-ol-3,11,20-trione, and 4-oxa-9α-chloro-16α,17α-isopropylidenedioxy-Δ¹-5α-pregnen-21-ol-3,11,20-trione, respectively, as well as the corresponding 5β-isomers.

EXAMPLE XXI

By hydrolyzing 4-oxa-9α-fluoro - 16α,17α - isopropylidenedioxy-5α-pregnane-11β,21-diol-3,20-dione 21-acetate and 4-oxa-9α-chloro-16α,17α - isopropylidenedioxy-Δ¹-5α-pregnan-21-ol-3,11,20-trione, in the manner described in Example IV hereinabove for the hydrolysis of the 17,20; 20,21-bismethylenedioxy grouping, the corresponding free 16α,17α-diols, namely, 4-oxa-9α-fluoro-5α-pregnane-11β, 16α,17α,21 - tetrol - 3,20 - dione 21-acetate and 4-oxa-9α-chloro-Δ¹-5α-pregnene-16α,17α,21-triol-3,11,20-trione, respectively, were obtained.

EXAMPLE XXII

By incubating 4-oxa-5α - pregnane - 17α,21-diol-3,20-dione, 4-oxa-19-nor-Δ¹ - 5α - pregnene-17α,21-diol-3,20-dione, 4-oxa-5α-pregnane-11β,17α,21-triol-3,20-dione, 4-oxa-Δ¹-5α-pregnene-17α,21-diol-3,11,20-trione, and 4-oxa-9α-fluoro-5α-pregnane-11β,17α,21-triol-3,20-dione, respectively, with *Streptomyces roseochromogenus*, ATCC No. 3347, in the manner described in Preparation A hereinabove, the corresponding 16α-hydroxy steroids, namely, 4-oxa-5α-pregnane-16α,17α,-21-triol-3,20-dione, 4-oxa-19-nor-Δ¹-5α-pregnene-16α,17α,21 - triol - 3,20-dione, 4-oxa-5α-pregnane-11β,16α,17α,21-tetrol - 3,20-dione, 4-oxa-Δ¹-5α-pregnene-16α,17α,21-triol-3,11,20-trione, and 4-oxa-9α-fluoro-5α-pregnane - 11β,16α,17α,21-tetrol-3,20-dione, respectively, are obtained.

EXAMPLE XXIII

The starting compounds of the present example were obtained according to my U.S. patent application Ser. No. 353,239 filed Mar. 19, 1964, now abandoned.

A cooled solution of 4 g. of 4-oxa-Δ¹-5α-pregnen-17α-ol-3,20-dione in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate collected by filtration, thus giving 21-iodo-4-oxa-Δ¹-5α-pregnen-17α-ol-3,20-dione. This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding 4-oxa-Δ¹-5α-pregnene-17α,21-diol-3,20-dione 21-acetate.

The starting compounds listed under I were treated by the above procedures, thus yielding firstly the corresponding 21-iodo derivatives and finally the corresponding products set forth under II:

I

16α,17α-isopropylidenedioxy-4-oxa-Δ¹-pregnene-3,20-dione
4-oxa-Δ¹-19-nor-5α-pregnen-17α-ol-3,20-dione
16α-methyl-4-oxa-Δ¹-5α-pregnen-17α-ol-3,20-dione

II

16α,17α-isopropylidenedioxy-4-oxa-Δ¹-5α-pregnen-21-ol-3,20-dione acetate
4-oxa-Δ¹-19-nor-5α-pregnene-17α,21-diol-3,20-dione-21-acetate
16α-methyl-4-oxa-Δ¹-5α-pregnene-17α,21-diol-3,20-dione-21-acetate

EXAMPLE XXIV

The following solutions "A," "B" an "C" were prepared using distilled water as solvent: solution "A" was prepared by mixing 425 cc. of a 1.742% dipotassic phosphate solution ($K_2HPO_4$) with 75 cc. of 1.38% monosodic phosphate; solution "B" was prepared by diluting a mixture of 1 lt. of 4.5% sodium chloride solution, 40 cc. of 5.75% potassium chloride solution and 10 cc. of a 19.1% magnesium sulfate, to a volume of 5 lt; solution "C" was prepared by dissolving 20.9 g. of fumaric acid and 14.4 g. of sodium hydroxide in 1 lt. of water and diluting the solution to 1.2 lt. Then 475 cc. of solution "A," 4.32 lt. of solution "B" and 1.2 lt. of soltuion "C" were mixed.

Adrenal glands of recently slaughtered cattle, defatted, were ground in a meat grinder until an homogeneous mass was obtained; to 1 kg. of homogenate was added 2 liters of the mixture of A, B, and C solutions with vigorous stirring. To the mixture there was then added 1 g. of compound No. 1 dissolved in 5.35 parts of propyleneglycol, the mixture was stirred at 28–37° C. for 3 hours, 13 liters of acetone were added and the mass was stirred at room temperature for an additional 1 hour.

The acetone extract was separated by filtration, the ground adrenals were washed with 6 liters of acetone, the extracts were combined and the solvent removed by distillation, under reduced pressure. Chromatography on alumina and crystallization of the solid fractions afforded 4-oxa-Δ¹-5α-pregnene-11β,17α,21-triol-3,20-dione.

The compounds prepared in Example XXIII were treated by the same procedure, thus yielding respectively:

16α,17α - isopropylidenedioxy - 4 - oxa-Δ¹-5α-pregnene-11β,21 - diol - 3,20-dione, 4-oxa-Δ¹-19-nor-5α-pregnene-11β,17α - triol - 3,20-dione, and 16α-methyl-4-oxa-Δ¹-5α-pregnene-11β,17α,21-triol-3,20-dione.

EXAMPLE XXV

A mixture of 1 g. of 4-oxa-Δ¹-5α-pregnene-11β,17α,21-triol-3,20-dione, 4 cc. of pyridine and 2 cc. of acetic anhydride was kept at room temperature overnight, poured into ice water, the formed precipitate was filtered, washed with water and dried. Crystallization from acetone-hexane gave 4-oxa-Δ¹-5α-pregnene-11β,17α,21-triol 3,20-dione 21-acetate.

The products of Example XXIV were esterified by the same procedure to give respectively:

16α,17α - isopropylidenedioxy - 4-oxa-Δ¹-5α-pregnene-11β,21 - diol - 3,20-dione 21-acetate, 4-oxa-Δ¹-19-nor-5α-pregnene - 11β,17α,21 - triol-3,20-dione 21-acetate, 16α-methyl - 4-oxa-Δ¹-pregnene-11β,17α,21-thiol-3,20-dione 21-acetate.

EXAMPLE XXVI 5 g. of 4 - oxa-Δ¹-5α-pregnene-11β,17α,21-triol-3,20-dione 21-acetate were dissolved with slow heating in 62.5 cc. of dimethylformamide, the mixture was cooled, 2 g. of mesyl chloride and 2.5 cc. of pyridine were added and the solution was kept at 80° C. for half an hour. The reaction mixture was cooled, water was added and the product was extracted with ethyl acetate. The extract was washed with water, dried over anhydrous sodium sulfate and the solvent was evaporated. Recrystallization of the residue from acetone-hexane furnished 4-oxa-Δ¹,⁹⁽¹¹⁾-5α-pregnadiene-17α,21-diol-3,20-dione 21-acetate.

2.8 g. of N-bromoacetamide were added to a mixture of 5 g. of the latter compound, 50 cc. of pure dioxane and 0.8 cc. of 0.4 N perchloric acid while stirring in the dark and at room temperature during 1 hour. The reaction mixture was stirred for 1 hour further, a solution of 10% sodium sulfite was then added until the potassium-starch indicator paper no longer turned blue, ice was added, the mixture was extracted with chloroform and the extract was washed consecutively with water, 5% aqueous sodium bicarbonate solution and water, and the solvent was removed by distillation under vacuo. By trituration of the residue with acetone there was obtained the corresponding 9α-bromo-11β-hydroxy compound.

A mixture of 2 g. of anhydrous potassium acetate and 20 cc. of acetone was heated almost to boiling and then a solution of 1.7 g. of the bromohydrin in 20 cc. of acetone was added slowly while stirring; the mixture was then refluxed for 10 hours, cooled and almost all of the acetone was distilled off; iced-water was then added, the precipitate was filtered, washed with water and dried. Upon recrystallization from methylene chloride-benzene there was obtained 4 - oxa - 9β,11β-oxido-Δ¹-5α-pregnene-17α-,21-diol-3,20-dione 21-acetate.

The compounds prepared in Example XXV were treated by the same procedures, thus giving firstly the corresponding Δ⁹⁽¹¹⁾-dehydro derivatives, secondly the corresponding 9α-bromo-11β-hydroxy compounds and finally, respectively, the following products:

16α, 17α-isopropylidenedioxy-4-oxa-9β, 11β-oxido-Δ¹-5α-pregnen-21-ol-3, 20-dione acetate, 4-oxa-9β, 11β-oxido-Δ¹-19-nor-5α-pregnene-17α, 21 - diol-3,20-dione, 21-acetate, and 16α-methyl-4-oxa-9β, 11β-oxido-Δ¹-5α-pregnene-17α, 21-diol-3, 20-dione 21-acetate.

EXAMPLE XXVII

In a polyethylene flask, adapted with magnetic stirrer, there was dissolved 1.8 g. of 4-oxa-9β 11β-oxido-Δ¹-5α-pregnene-17α, 21-diol-3, 20-dione 21-acetate prepared in Example XXVI, in 30 cc. of methylene chloride, the solution was cooled to 0° C. and a solution of 2.11 g. of anhydrous hydrogen fluoride in 3.7 cc. of tetrahydrofuran cooled in a Dry Ice-acetone bath (−70° C.) was added over a period of 20 minutes with constant stirring. The mixture was stirred at a temperature lower than 10°C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the insoluble material was filtered off and the filtrate cooled whereby there crystallized 4 - oxa-9α-fluoro-Δ¹-5α-pregnene-11β,17α,21-triol-3,20-dione 21-acetate.

The compounds of Example XXVI were treated by the same procedure thus yielding respectively:

16α, 17α - isopropylidenedioxy-4-oxa - 9α - fluoro-Δ¹-5α-pregnene - 11β,21 - diole-3,20-dione 21-acetate, 4-oxa-9α-fluoro-Δ¹-19-nor-5α-pregnene-11β,17α, 21 - triol - 3,20-dione 21-acetate and 16α-methyl-4-oxa9α-fluoro-Δ¹-5α-pregnene-11β,17α,21-triol-3,20-dione 21-acetate.

EXAMPLE XXVIII

To a solution of 4 g. of 4 - oxa - 9β,11 - oxido-Δ¹-5α-pregnene-17α,21-diol-3,20-dione 21-acetate in 40 cc. of anhydrous chloroform, was added, over a period of 35 minutes, 30 cc. of a 0.45 N solution of dry hydrogen chloride in chloroform, under continuous stirring and maintaining the temperature around 0°C. The mixture was then stirred at 0° C. for 1 hour further, diluted with water and the chloroform layer was seperated, washed with aqueous sodium bicarbonate solution and then with water, dried over anydrous sodium sulfate and evaporated under reduced pressure. Crystallization of the residue from acetone-hexane gave 4-oxa-9α-chloro-Δ¹-5α-pregnene-11β,17α,21-triol-3,20-dione 21-acetate.

The remaining products of Example XXVI were treated by the same procedure, to give respectively:

16α, 17α - isopropylidenedioxy-4-oxa - 9α-chloro-Δ¹-5α-pregnene-11β,21-diol-3,20 - dione 21 - acetate, 4 - oxa-9α-chloro-Δ¹-19-nor-5α-pregnene-11β,17β, 21 - triol - 3,20-dione 21-acetate and 16α-methyl-4-oxa-9α-chloro-Δ¹-5α-pregnene-11β,17α, 21-triol-3,20 dione 21-acetate.

EXAMPLE XXIX

A solution of 1 g. of 4-oxa-Δ¹-5α-pregnene-11β,17α, 21-triol-3,20-dione 21-acetate in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 4-oxa-Δ¹-5α-pregnene-17α, 21-diol-3, 11, 20-trione 21-acetate.

The 4-oxa-9α-fluoro-Δ¹-5a-pregnene - 11β,17α,21 - triol-3,20-dione 21-acetate of Example XXVII and the corresponding 9α-chloro derivative prepared in Example XXVIII were treated by the same procedure to give respectively: 4 - oxa - 9α - fluoro-Δ¹-5α-pregnene-17α,21-diol-3,11,20-trione 21-acetate and 4 - oxa - 9α - chloro-Δ¹-5α-pregnene-17α,21-diol-3,11,20-trione 21-acetate.

The compounds prepared in Examples XXV, XXVII, and XXVIII were treated by the same procedure, thus yielding the corresponding 11-keto derivatives.

EXAMPLE XXX 2 g. of 4 - oxa - 9α - fluoro-Δ¹-5α-pregnene-11β,17α,21-triol-3,20-dione 21-acetate was dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystalized from ethyl acetate-methanol, thus producing 4 - oxa - 9α - fluoro-Δ¹-5α-pregnene-11β,17α,21-triol-3,20-dione.

The rest of the compounds obtained according to Example XXVII, and the compounds produced according to Examples XXVIII and XXIX, were treated by the latter procedure, thus affording the corresponding 21-free hydroxy compounds.

EXAMPLE XXXI

4 - oxa-Δ¹-5α-pregnene - 11β,17α,21 - triol - 3,20 - dione prepared in Example XXIV was treated according to Example XXV except that propionic anhydride, enanthic anhydride and caproic anhydride were used instead of acetic anhydride, thus yielding respectively the 21- propionate, 21-enanthate and 21-caproate of 4-oxa-Δ¹-5α-pregnene-11β,17α,21-triol-3,20-dione.

The remaining compounds perpared in Example XXIV and the compounds obtained according to Example XXX were treated by the same procedures, thus producing the corresponding 21-propionates, 21-enanthates and 21-caproates of said compounds.

It will be obvious to those skilled in the art that other changes and variations can be made in carrying out the present invention without departing from the spirit and scope thereof as defined in the appended claims.

I claim:

1. A compound represented by the general formula:

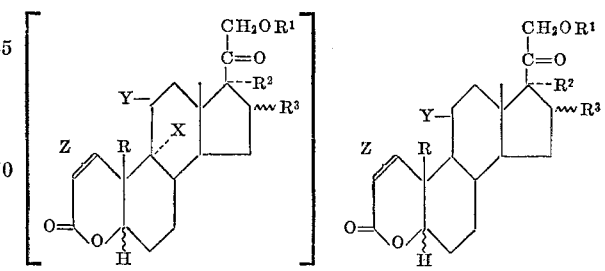

wherein R is selected from the group consisting of hydrogen and methyl, $R^1$ is selected from the group consisting of hydrogen and a hydrocarbon carboxylic acyl group containing less than 12 carbon atoms, $R^2$ represents hydroxyl, $R^3$ is selected from the group consisting of hydrogen, α-methyl, β-methyl, α-hydroxyl and an α-hydrocarbon carboxylic acyloxy group containing less than 12 carbon atoms, $R^2$ and $R^3$ taken together represent the grouping

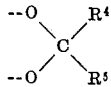

wherein $R^4$ and $R^5$ are selected from the group consisting of hydrogen, an alkyl group and an aryl group containing up to 8 carbon atoms, inclusive Y is selected from the group consisting of hydrogen, β-hydrozyl and keto, and Z is selected from the group consisting of a saturated linkage and a double bond at the 1(2)-position.

2. 4-oxapregnane-17α,21-diol-3,20-dione.
3. 4-oxa-Δ¹-pregnene-17α,21-diol-3,20-dione.
4. 4-oxapregnane-11β,17α,21-triol-3,20-dione.
5. 4-oxa-19-norpregnane-11β,17α,21-triol-3,20-dione.
6. 4 - oxa - 16 - methylpregnane-11β,17α,21-triol-3,20-dione.
7. 4-oxapregnane-11β,16α,17α,21-tetrol-3,20-dione.
8. 4-oxa-Δ¹-pregnene-11Δ,17α,21-triol-3,20-dione.
9. 4 - oxa - 16 - methyl-Δ¹-pregnene-11β-,17α,21-triol-3,20-dione.
10. 4-oxapregnane-17α,21-diol-3,11,20-trione.
11. 4-oxa-Δ¹-pregnene-17α,21-diol-3,11,20-trione.
12. A compound represented by the general formula:

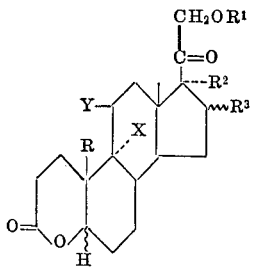

wherein R is selected from the group consisting of hydrogen and methyl, $R^1$ is selected from the group consisting of hydrogen and hydrocarbon carboxylic acyl group containing less than 12 carbon atoms, $R^2$ represents hydroxyl, $R^3$ is selected from the group consisting of hydrogen, α-methyl, β-methyl, α-hydroxyl and an α-hydrocarbon carboxylic acyloxy group containing less than 12 carbon atoms, $R^2$ and $R^3$ taken together represent the grouping

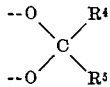

wherein $R^4$ and $R^5$ are selected from the group consisting of hydrogen, an alkyl group and an aryl group containing up to 8 carbon atoms, inclusive, X is selected from the group consisting of fluoro, chloro and bromo and Y is selected from the group consisting of hydrogen, β-hydroxyl and keto.

13. 4 - oxa-9α-halopregnane-11β,17α,21-triol-3,20-dione wherein the halogen has an atomic number less than 53.
14. 4 - oxa - 9α - halo - 16α,17α-isopropylidenedioxy-pregnane-11β,21-diol-3,20-dione wherein the halogen has an atomic number less than 53.
15. 4 - oxa - 9α-halo-16α,17α-isopropylidenedioxy-Δ¹-pregnane-11β,21-diol-3,20-dione wherein the halogen has an atomic number less than 53.
16. 4-oxa - 9α - fluoro - 16α,17α - isopropylidenedioxy-pregnene-11β,21-diol-3,20-dione.
17. 4-oxa-9α-fluoro - 16α,17α - isopropylidenedioxy-Δ¹-pregnene-11β,21-diol-3,20-dione.
18. 4 - oxa-9α-halopregnane-17α,21-diol-3,11-,20-trione wherein the halogen has an atomic number less than 53.
19. 4-oxa-9α-halo-Δ¹-pregnene - 17α,21 - diol-3,11,20-trione wherein the halogen has an atomic number less than 53.
20. A compound represented by the general formula:

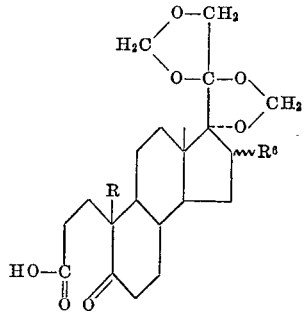

wherein R is selected from the group consisting of hydrogen and methyl and $R^6$ is selected from the group consisting of hydrogen, α - methyl, β - methyl and α-hydroxyl.

21. 17,20;20,21 - bismethylenedioxy - 3,5 - secopregnan-5-one-3-oic acid.
22. 16 - methyl - 17,20;20,21 - bismethylenedioxy - 3,5-secopregnan-5-one-3-oic acid.
23. 17,20;20,21 - bismethylenedioxy - 3,5 - secopregnan-16α-ol-5-one-3-oic acid.

References Cited

UNITED STATES PATENTS 3,179,658   4/1965   Hirschmann et al.   260—340.9 X

OTHER REFERENCES

Pettit et al., "Journal of Organic Chemistry," vol. 26, No. 11 (1961) pp. 4557–63.

NICHOLAS S. RIZZO, *Primary Examiner.*

JAMES H. TURNIPSEED, *Assistant Examiner.*

UNITED STATES PATENT OFFICE
CERTIFICATE OF CORRECTION

Patent No. 3,413,311            November 26, 1968

Alexander D. Cross

It is certified that error appears in the above identified patent and that said Letters Patent are hereby corrected as shown below:

Column 2, Formula IV should appear as shown below:

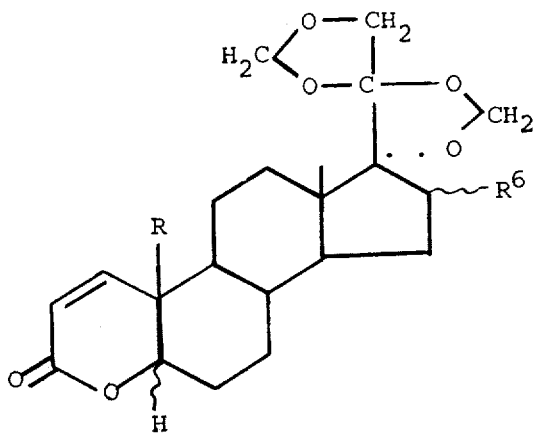

Column 7, line 42, "methyl-" should read -- bismethyl- --. Column 8, line 72, "5" should read -- 5α --. Column 11, line 53, "71" should read -- 21 --. Column 18, line 3, "an" should read -- and --; line 35, "11β,17α-triol" should read -- 11β,17α,21-thriol --; line 51, "$\Delta^1$-pregnene-11β,17α,21-thiol" should read -- $\Delta^1$-5α-pregnene-11β,17α,21-triol --. Column 21, line 26, "11Δ" should read -- 11β --. Column 22, line 14, "pregnene" should read -- pregnane --; line 17, "11-" should read -- 11 --.

Signed and sealed this 7th day of April 1970.

(SEAL)
Attest:

EDWARD M. FLETCHER, JR.            WILLIAM E. SCHUYLER, JR.
Attesting Officer            Commissioner of Patents